(12) United States Patent
Das et al.

(10) Patent No.: US 8,839,031 B2
(45) Date of Patent: Sep. 16, 2014

(54) DATA CONSISTENCY BETWEEN VIRTUAL MACHINES

(75) Inventors: Partho P. Das, Hyderabad (IN); Rohit Jaini, Hyderabad (IN); Vijay Krishna Tandra Sistla, Hyderabad (IN); Rahul Shrikant Newaskar, Hyderaba (IN)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 13/454,272

(22) Filed: Apr. 24, 2012

(65) Prior Publication Data

US 2013/0283092 A1   Oct. 24, 2013

(51) Int. Cl.
*G06F 11/00* (2006.01)

(52) U.S. Cl.
USPC ........................................................... 714/13

(58) Field of Classification Search
CPC ............ G06F 11/1484; G06F 11/0712; G06F 11/1004; G06F 11/2064; G06F 11/2082
See application file for complete search history.

(56) References Cited

U.S. PATENT DOCUMENTS

| | | | |
|---|---|---|---|
| 6,065,018 A | 5/2000 | Beier et al. | |
| 7,406,487 B1 | 7/2008 | Gupta et al. | |
| 7,457,980 B2 | 11/2008 | Yang et al. | |
| 7,831,550 B1 | 11/2010 | Pande et al. | |
| 7,979,654 B2 | 7/2011 | Stager et al. | |
| 8,060,476 B1 * | 11/2011 | Afonso et al. | 707/649 |
| 8,135,930 B1 * | 3/2012 | Mattox et al. | 711/162 |
| 8,375,003 B1 * | 2/2013 | Afonso et al. | 707/645 |
| 8,607,066 B1 * | 12/2013 | Kailash et al. | 713/188 |
| 2002/0035695 A1 * | 3/2002 | Riches et al. | 713/193 |
| 2006/0225065 A1 | 10/2006 | Chandhok et al. | |
| 2009/0113109 A1 | 4/2009 | Nelson et al. | |
| 2010/0115332 A1 | 5/2010 | Zheng et al. | |
| 2010/0198788 A1 | 8/2010 | Sim-Tang | |
| 2010/0262586 A1 | 10/2010 | Rosikiewicz et al. | |
| 2011/0191299 A1 | 8/2011 | Huynh Huu et al. | |
| 2011/0214013 A1 | 9/2011 | Bensinger | |
| 2013/0212709 A1 * | 8/2013 | Tucker | 726/29 |
| 2013/0275376 A1 * | 10/2013 | Hudlow et al. | 707/639 |

OTHER PUBLICATIONS

Chalaka, "Examining Data Replication and Data Mirroring Technologies as Part of a Disaster Recovery Plan," retrieved on Nov. 14, 2011 at <<http://www.continuitycentral.com/feature0123.htm>>, 2 pages.

(Continued)

*Primary Examiner* — Christopher McCarthy
(74) *Attorney, Agent, or Firm* — John Jardine; Kate Drakos; Micky Minhas (57) ABSTRACT

Data consistency between a primary virtual machine and a recovery virtual machine may employ a resync engine to detect differences in data blocks stored on both virtual machines. For example, the resync engine may calculate a signature (e.g., hash value) for a primary data block and a corresponding signature for a recovery data block, and compare the signature and the corresponding signature to identify a difference between the primary data block and the recovery data block. In some instances, by identifying a difference between the primary data block and the recovery data block, a data block (e.g., primary data block or recovery data block) may be identified to be transferred from a virtual machine to another virtual machine.

20 Claims, 8 Drawing Sheets

(56) References Cited

OTHER PUBLICATIONS

Distler et al., "State Transfer for Hypervisor-Based Proactive Recovery of Heterogeneous Replicated Services," Oct. 5-7, 2010, Proceedings: 5th "Sicherheit, Schutz und Zuverlassigkeit" Conference, retrieved at <<http://subs.emis.de/LNI/Proceedings/Proceedings170/P-170.pdf>>, pp. 61-72.

Siebert, "Veeam Backup tips and a preview of Veeam Backup and Replication," retrieved on Jan. 12, 2012 at <<http://searchdatabackup.techtarget.com/Veeam-Backup-tips-and-a-preview-of-Veeam-Backup-and-Replication-5>>, 13 pages.

\* cited by examiner

DATA CONSISTENCY BETWEEN VIRTUAL MACHINES

RELATED APPLICATION

This application is related to U.S. Patent Application entitled "Initializing Replication in a Virtual Machine," application Ser. No. 13/454,299, filed on Apr. 24, 2012, the disclosure of which is incorporated by reference herein.

BACKGROUND

To support business continuity, a replication relationship is established between a primary virtual machine running a production workload at a primary site and a recovery virtual machine at a recovery site. Thereafter, changes caused by modifications to the production workload are sent from the primary virtual machine to the recovery virtual machine. This replication relationship may allow an administrator to failover the production workload to the recovery virtual machine when an event (e.g., disaster) occurs at the primary site that affects the primary virtual machine.

In some instances, an unscheduled power outage, hardware failure, inadvertent administrator change, or the like, may cause a break in a replication relationship. This may result in inconsistent data between a primary virtual machine and a recovery virtual machine. To reestablish consistent data, a production workload may be sent from a primary site to a recovery site. This requires a large amount of data to be transferred to the recovery site, which is time consuming and utilizes significant network bandwidth. In addition, a failover of the production workload to the recovery site is not possible while sending all, or even a portion, of the production workload to the recovery site.

In some instances, a recovery virtual machine may be initialized for data replication by receiving large amounts of data from a primary virtual machine and storing the data. The large amounts of data required for initialization of the recovery virtual machine may be received over a network (e.g., as a data stream) or off the network (e.g., shipped to the recovery site). In either case, receiving large amounts of data from the primary virtual machine typically takes significant amounts of time (e.g., to receive a shipped copy of the primary virtual machine) and/or network bandwidth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

This disclosure describes techniques directed to, in part, maintaining consistent data (e.g., uniform data) between a primary virtual machine and a recovery virtual machine. In some implementations, data blocks of the primary virtual machine may be compared with corresponding data blocks of the recovery virtual machine to determine whether the data blocks of the primary virtual machine are different than the corresponding data blocks of the recovery virtual machine. When data blocks of the primary virtual machine are different than data blocks of the recovery virtual machine, the data blocks that differ between the two virtual machines may be sent from the primary virtual machine to the recovery virtual machine, or from the recovery virtual machine to the primary virtual machine (e.g., in cases of restoring the primary virtual machine after failover to the recovery virtual machine).

For example, to synchronize data between the primary virtual machine and the recovery virtual machine, a first data signature for a primary data block and a second data signature for a recovery data block are calculated. Next, the first data signature is compared with the second data signature to determine whether the first and second signatures are different. When it is determined that the first data signature and the second data signature are different, the primary data block is sent to the recovery virtual machine or the recovery data block is sent to the primary virtual machine.

This disclosure also describes techniques directed to, in part, initializing a recovery virtual machine in a replication relationship. The recovery virtual machine may be initialized by comparing data blocks on a primary virtual machine to corresponding data blocks previously stored at the recovery site, and sending the data blocks that are not already stored at the recovery site from the primary virtual machine to the recovery virtual machine.

For instance, a resync engine may calculate data signatures (e.g., one or more hash values) for both a primary data block and a corresponding recovery data block, and subsequently compare the calculated data signatures to determine if the primary data block and the corresponding recovery data block are alike (e.g., include the same data). Data blocks that differ will be sent from the primary virtual machine to initialize the recovery virtual machine. In some instances, the resync engine initializes the recovery virtual machine with data already present at the recovery site (e.g., stored in a tape or a disk). Further, in some instances the recovery virtual machine is initialized without interrupting existing backup configurations at the primary virtual machine.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Business continuity may rely on a replication relationship between a primary virtual machine (VM) and a recovery VM. The replication relationship applies changes in a production workload executing on the primary VM to the recovery VM. This establishes data consistency between the two virtual machines. When data is consistent (e.g., matches) between both virtual machines, the production workload may failover to the recovery site with minimal impact to business continuity. However, in the event that a replication relationship is broken, data may not be consistent between both virtual machines. This delays failover of the production workload until the replication relationship is reestablished. For example, unscheduled power outages, hardware failure, administrator error, or the like, may result in a failed replication relationship that delays failover. Typical techniques reestablish the replication relationship by transferring large portions of data, a process that requires large amounts of time and network bandwidth.

In addition, before establishing a replication relationship between a primary VM and a recovery VM, the recovery VM must first be initialized with data from the primary VM. That is, the recovery VM must receive and store data that is stored at the primary virtual machine up to a point in time when the recovery VM is initialized. Typical techniques initialize the recovery VM by transferring large portions of data requiring a significant amount of time and/or network bandwidth. These techniques usually require coordination with an existing backup workflow (e.g., a workflow with change tracking mechanisms that enable applications to query for changes to data in a database and access information that is related to these changes), thus increasing an amount of time to initialize the recovery VM.

This disclosure describes techniques directed to, in part, maintaining data consistency between a primary VM and a recovery VM. In some instances, data blocks from a primary VM and a recovery VM may be compared, and either virtual machine may be updated with the data blocks that differ between the two virtual machines.

This disclosure also describes techniques directed to, in part, initializing a recovery VM in a replication relationship by comparing data blocks on a primary VM to corresponding data blocks previously stored at the recovery site, and sending the data blocks that are not already stored at the recovery site from the primary VM to the recovery VM.

In some implementations, a resync engine is implemented to maintain data consistency between virtual machines. In one embodiment, the resync engine may identify (e.g., determine) a change in data between a primary data block from a primary VM and a corresponding recovery data block from a recovery VM. The change may be identified by, for example, calculating signature data for the primary data block and the recovery data block and comparing the signatures. In one embodiment, based on the comparison, the resync engine instructs (e.g., causes) the primary VM to send the primary data block including different content than the recovery data block to the recovery VM. In another embodiment, the resync engine instructs the recovery VM to send the corresponding recovery data block to the primary VM.

Meanwhile, a log may be generated at a primary virtual machine or a recovery virtual machine. The log may record production workload changes including production workload changes made while reestablishing consistent data between the primary VM and the recovery VM. The log may be applied (e.g., stored) to the primary VM or the recovery virtual machine after data consistency is reestablished.

In some implementations, the resync engine employs a parallel pipeline to logically compare a primary virtual hard disk and a recovery virtual hard disk. For example, the resync engine may be implemented as multiple modules in which the output of one module serves as an input to another module with buffer storage storing outputs and inputs for the modules.

Techniques may be implemented in a system that includes a primary VM at a primary host, a recovery VM (e.g., a replica VM) at a recovery host, and a resync engine located remotely from either host or at the primary host and/or the recovery host. Each VM may include one or more virtual hard disks (VHDs) and one or more differencing VHDs. For example, the primary VM may include a primary VHD acting as a parent for a primary differencing VHD which stores all production workload changes. In another example, the recovery VM may include a recovery VHD acting as a parent for a recovery differencing VHD which receives, periodically, data blocks from the primary VHD.

The techniques described herein may apply to a chain of differencing virtual hard disks (e.g., a differencing virtual hard disk serving as a parent to another differencing virtual hard disk). For ease of illustration, many of these techniques are described in the context of data consistency between a single primary virtual machine at the primary host and a single recovery virtual machine at the recovery host. However, the techniques described herein are not limited to one virtual machine at each site. For example, the techniques described herein may be used to implement data consistency between a chain of differencing virtual hard disks.

In some instances, by incorporating the resync engine, data consistency between the primary and recovery virtual machines is established, or maintained. This may minimize CPU utilization, memory utilization, and/or disk throughput (e.g., IOPS) at the primary VM and the recovery VM. Further, in some instances the resync engine reestablishes the replication relationship without stopping the primary VM from collecting delta changes (e.g., changes to a production workload). In addition, in some instances by sending data blocks that differ between the primary VM and the recovery VM, impact on network bandwidth is minimized and CPU utilization, memory utilization, and/or disk throughput (e.g., IOPS) are minimized at the primary VM and the recovery VM.

Illustrative Architecture

Figure 1:
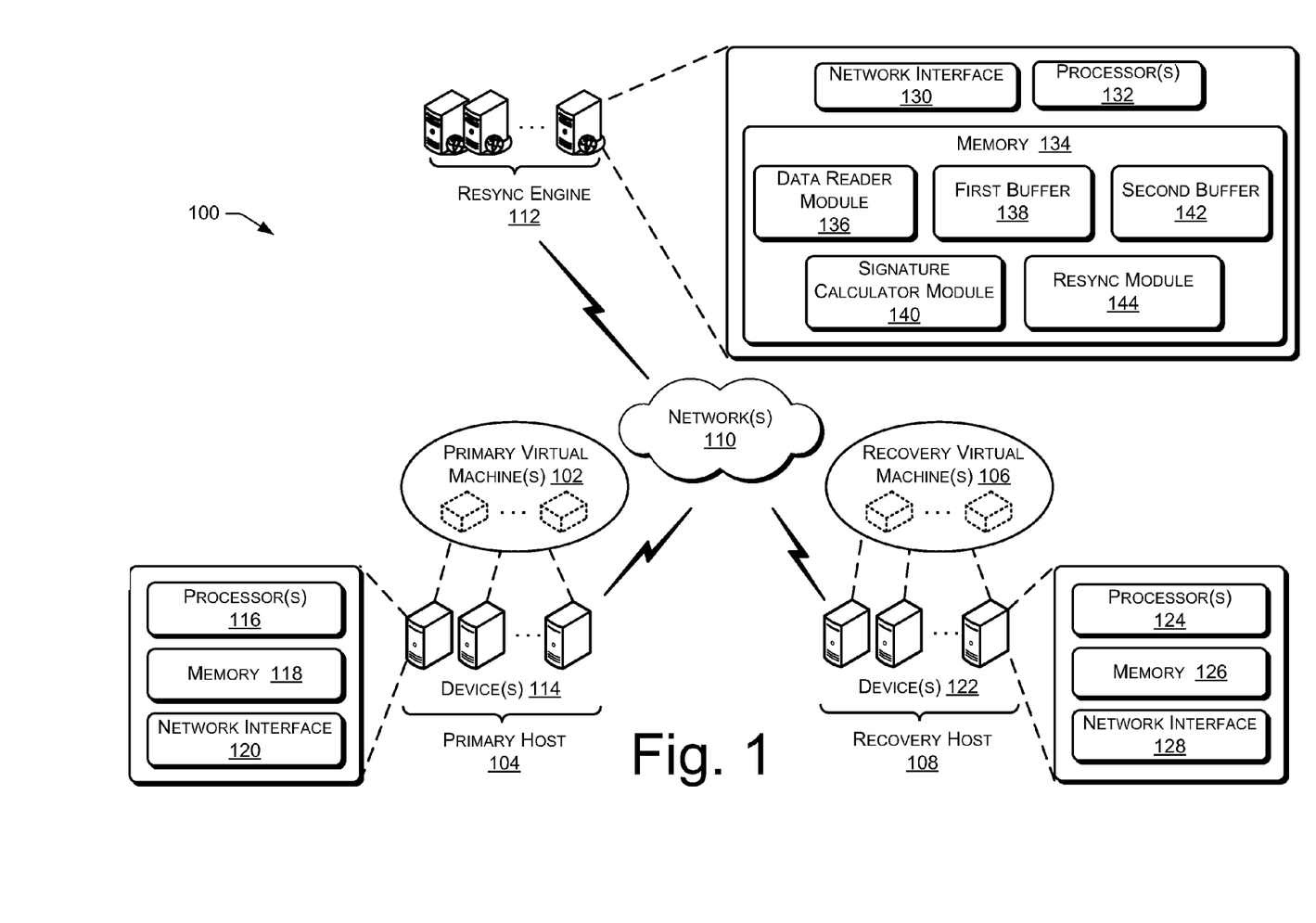
FIG. 1 is a schematic diagram of an example architecture to implement techniques described herein for maintaining data consistency between a primary virtual machine and a recovery virtual machine and/or initializing a recovery virtual machine from data stored at a primary virtual machine.

FIG. 1 is a schematic diagram of an example architecture 100 to implement techniques described herein for maintaining data consistency between a primary virtual machine and a recovery virtual machine and/or initializing a recovery virtual machine from data stored at a primary virtual machine. The example architecture 100 includes one or more primary virtual machines 102 (referred to as the primary VM 102) implemented at a primary host 104, one or more recovery virtual machines 106 (referred to as the recovery VM 106) implemented at a recovery host 108, a network(s) 110, and a resync engine 112. As illustrated, the primary VM 102 is implemented on one or more devices 114 (referred to as the device 114). The one or more devices 114 include processor(s) 116, memory 118, and a network interface 120. As also illustrated, the recovery VM 106 is implemented on one or more devices 122 (referred to as the device 122). The one or more devices 122 include processor(s) 124, memory 126, and a network interface 128.

In the illustrated example, the resync engine 112 maintains data consistency between the primary host 104 and the recovery host 108. The primary VM 102 and the recovery VM 106 may communicate with the resync engine 112 via the network(s) 110. In some embodiments, the primary host 104 and/or the recovery host 108 may include a chain of differencing virtual hard disks. For example, a primary differencing virtual hard disk may be a parent for another primary differencing virtual hard disk which may result in saving disk space.

The network(s) 110 represents any one or combination of multiple different types of wired and/or wireless networks, such as cable networks, the Internet, private intranets, and the like. Although FIG. 1 illustrates the primary VM 102 and the recovery VM 106 communicating with the resync engine 112 over the network(s) 110, techniques described herein may apply in any other networked or non-networked architectures.

While the example architecture of FIG. 1 illustrates the resync engine 112 located separately from the primary VM 102 and the recovery VM 106, in other embodiments, the resync engine 112 may be implemented in whole or in part at the primary host 104 and/or the recovery host 108. For example, some functions of the resync engine 112 may be implemented at the primary VM 102 and other functions may be implemented at the recovery VM 106.

In the illustrated example, the device 114 comprises the one or more processors 116, the memory 118, and the network interface 120. The one or more processors 116 and the memory 118 enable the device 114 to perform various functionality described herein. The network interface 120 allows the device 114 to communicate with the resync engine 112 and/or the recovery VM 106 through the network 110. Here, the device 114 may implement the primary VM 102.

Meanwhile, the device 122 may implement the recovery VM 106 and may include the one or more processors 124, the memory 126, and the network interface 128. The one or more processors 116 and the memory 118 enable the device 122 to perform various functionality described herein. The network interface 128 allows the device 122 to communicate with the resync engine 112 and/or the primary VM 102 through the network 110.

Within the architecture 100, each of the devices 114 and 122 may be implemented as, for example, a server, a personal computer, a tablet computer, a laptop computer, a personal digital assistant (PDA), a mobile phone, a set-top box, a game console, an electronic book reader, a combination thereof, or the like. In one example, the devices 114 and/or 112 are configured in a cluster, data center, cloud computing environment, or a combination thereof.

Although not illustrated, the devices 114 and/or 122 may include and/or be communicatively coupled to one or more routers, switches, hubs, bridges, repeaters, or other networking devices and/or hardware components utilized to perform virtualization and/or replication operations. Each of the devices 114 and 122 and/or the resync engine 112 may be configured in one or more networks, such as a Local Area Network (LAN), Home Area Network (HAN), Storage Area Network (SAN), Wide Area Network (WAN), etc.

As illustrated, the resync engine 112 includes a network interface 130, processor(s) 132, and memory 134. The memory 134 stores a data reader module 136, a first buffer 138, a signature calculator module 140, a second buffer 142, and a resync module 144. The network interface 130 enables the resync engine 112 to communicate with other components over the network 110. For example, the resync network 112 may communicate with the primary VM 102 and/or the recovery VM 106.

The processor 132 and the memory 134 enable the resync engine 112 to perform various functionality described herein. The data reader module 136 receives data from, for instance, the primary VM 102 and/or the recovery VM 106. By way of example and not limitation, the data received may include one or more data blocks (e.g., primary data blocks from the primary VM 102 and/or recovery data blocks from the recovery VM 106). In some instances, the data blocks are received in a streaming format. The first buffer 138 receives the data (e.g., data block(s)) from the data reader module 136, and outputs the data to the signature calculator module 140.

The signature calculator module 140 may calculate a data signature for a data block and/or one or more sub-blocks of the data block. For example, a cyclic redundancy check (CRC) signature may be calculated for a data block and/or a predetermined number of bytes of the data block (e.g., a portion of the data block). For example, a CRC signature may be calculated for every 4 KB portion of the data block. In one implementation, the signature calculator module 140 may calculate a CRC64 signature for each data block received. In one example, the size of a particular data block may be about 4 MBs. Alternatively, or additionally, the resync engine 112 may calculate a CRC64 signature for a portion of data within the data block, such as a 4 KB section of data within the data block. In some implementations, the signature calculator module 140 may receive one or more data blocks from the first buffer 138 after a time period (e.g., predetermined time period) has expired since the one or more data blocks were sent to the first buffer 138. For instance, the signature calculator module 140 may receive the one or more data blocks from the first buffer 138 approximately one nano-second after the one or more data blocks are sent to the first buffer 138.

In some instances, a calculated data signature is sent to and stored in the second buffer 142. The data signature is then loaded from the second buffer 142 into the resync module 144. As an example, the first buffer 138 and the second buffer 142 may each be a circular buffer. A circular buffer may maintain the order of input data in relation to other input data that enter the buffer. For example, a circular buffer may operate in a first in, first out manner.

In one implementation, the resync module 144 compares signature data representing a primary data block with corresponding signature data representing a recovery data block. If the signature data of the primary data block matches (e.g., is identical) the corresponding signature data of the recovery data block, then the resync module 144 continues processing a new primary data block and/or a new recovery data block. If, on the other hand, the resync module 144 determines that the signature data of the primary data block differs from the signature data of the recovery data block, then the resync module 144 may, for example, notify (e.g., instruct) a virtual machine to send the data blocks that differ. For example, the resync module 144 may notify the primary VM 102 to send data blocks that differ to a recovery differencing VHD of the recovery VM 106. Alternatively, the resync module 144 may, for example, notify the recovery VM 106 to send data blocks that differ to the primary VM 102 (e.g., synchronizing the primary VM 102 after failover).

In the example of FIG. 1, the resync module 144 is located separately from the primary host 104 and the recovery host 108. Here, the resync module 144 may communicate with the primary VM 102 and/or the recovery VM 106 via network 110. However, in some instances the resync module 144, or functions of the resync module 144, may be implemented at the primary host 104 and/or recovery host 108. When located at the primary host 104, the resync module 144 may utilize hardware, software, and/or firmware in the device 114. Meanwhile, when located at the recovery host 108, the resync module 144 may utilize hardware, software, and/or firmware in the device 122.

In the illustrated implementation, the resync engine 112, the device 114, and the device 122 are shown to include multiple modules and components. The illustrated modules may be stored in the memory 118, the memory 126, and/or the memory 134. As used herein, memory may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Figure 2:
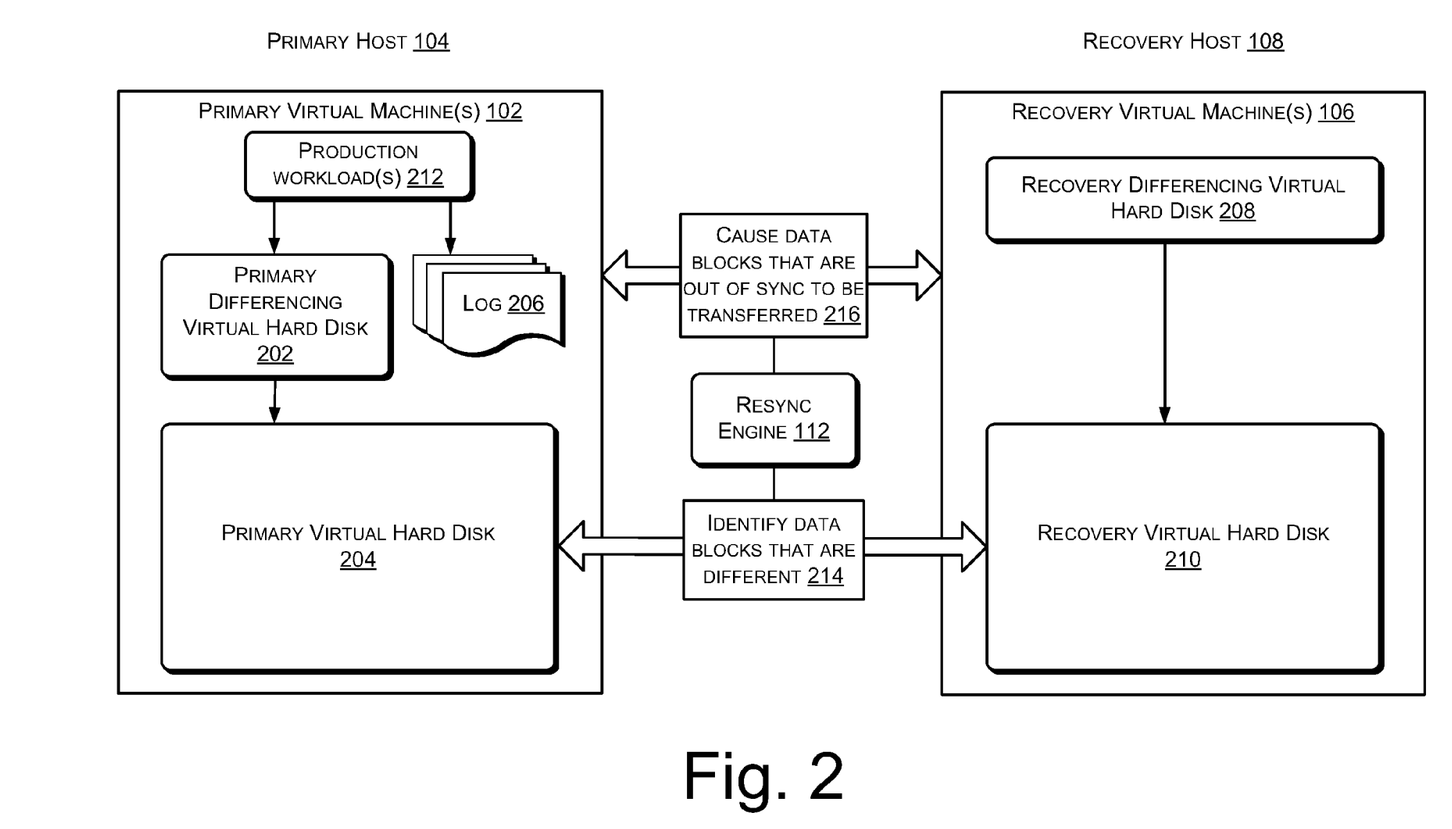
FIG. 2 illustrates example components of the primary virtual machine and the recovery virtual machine of FIG. 1.

FIG. 2 illustrates example components of the primary VM 102 and the recovery VM 106 of FIG. 1. As illustrated, the primary host 104 includes the primary VM 102 which comprises a primary differencing virtual hard disk (VHD) 202, a primary VHD 204, and one or more logs 206. Meanwhile, the recovery host 108 includes the recovery VM 106 which comprises a recovery differencing VHD 208, and a recovery VHD 210. The primary VHD 204 and/or the recovery VHD 210 may include a fixed sized VHD, a dynamically expanding VHD, or the like.

As illustrated, FIG. 2 also includes one or more production workloads 212 (hereinafter the production workload 212) executing on the primary VM 102. Here, changes caused by the production workload 212 may be replicated from the primary VM 102 to the recovery VM 106. The changes may comprise one or more modifications, updates, alterations, and/or transfers of data associated with execution of the production workload 212. In other words, as the production workload 212 is executed on one or more virtual machines, data may be modified, updated, altered, and/or transferred. For instance, the memory 118 of the device 114 implementing the primary VM 102 may be changed to reflect a change of the data.

The primary differencing VHD 202 stores production workload changes from the device 114. For example, the primary differencing VHD 202 stores the production workload changes as data blocks. In some instances, the primary VHD 204 stores production workload changes (e.g., data captured on the device 114) before the production workload changes are stored to the primary VHD 204. Further, in some instances data blocks stored in the primary VHD 204 may be periodically sent, via the network 110, to the resync engine 112 for processing. By way of example and not limitation, data blocks from the primary VHD 204 may be sent to the resync engine 112 on a predetermined time period, such as every five minutes.

In some examples, by utilizing the primary differencing VHD 202, the resync engine 112 can reestablish a replication relationship without stopping the production workload 212. For example, in the event that the resync workflow is in progress (e.g., the resync engine 112 is communicating with the primary VM 102), the primary differencing VHD 202 stores the production changes from the device 114, and applies the stored changes to the primary VHD 204 after the resync workflow is complete.

In one embodiment, the primary VHD 204 may receive a request from the resync engine 112 to send data blocks that are out of sync (e.g., do not completely match) to the recovery VM 106. As discussed above, the resync engine 112 may identify data blocks that are different 214 between the primary virtual hard disk 204 and the recovery virtual hard disk 210. If it is determined that the identified data blocks are different 214, then the resync engine 112 may cause the data blocks that are out of sync (e.g., data blocks that are different) to be transferred 216. For instance, the data blocks that are out of sync may be sent from the primary virtual machine 102 to the recovery virtual machine 106, or from the recovery virtual machine 108 to the primary virtual machine 102. In one implementation, the primary VHD 204 sends data blocks that are determined to be out of sync by the resync engine 112 to the recovery differencing VHD 208.

In the illustrated example, the log 206 records changes occurring due to, for example, the production workload 212. The log 206 may record the changes while the primary VM 102 is functioning normally. In one implementation, the log 206 may identify which changes have been saved in the primary differencing VHD 202 during a resync process (e.g., the resync engine 112 is communicating with the primary VM 102). After the resync process completes, the log 206 identifies which production workload changes received by the primary differencing VHD 202 are needed to sync the primary virtual hard disk 204 with all production workload changes. Based on the log 206, the primary differencing VHD 202 may send changes that occurred during the resync process to the primary virtual hard disk 204. In another implementation, the log 206 may record changes to the production workload 212 made while reestablishing consistent data between the primary VM 102 and the recovery VM 106. The log 206 may be applied (e.g., stored) to the recovery VM 106 after the resync process completes (e.g., the resync engine 112 is no longer processing data from the primary VM 102 and the recovery VM 106).

Still referring to FIG. 2, the recovery differencing VHD 208, with the recovery VHD 210 as a parent, is logically identical to the primary VHD 204 after receiving the out of sync data blocks from the primary VHD 204. After receiving the out of sync data blocks from the primary VHD 204, the recovery differencing VHD 208 applies its contents to the recovery VHD 210 (e.g., sends data to be stored to the recovery VHD 210) in order to ensure that the recovery VHD 210 is identical to the primary VHD 204. In one implementation, one or more data blocks are applied from the recovery differencing VHD 208 to the recovery VHD 210.

In the illustrated example, the production workload 212 sends changes to either the primary differencing VHD 202 and the log 206, or the recovery differencing VHD 208. For example, the production workload changes may be sent to the primary differencing VHD 202 and the log 206 while the primary VM 102 is in a state other than failover. In the event of a failover to the recovery VM 106, the changes to the production workload 212 may be sent from the primary virtual machine 102 to the recovery differencing VHD 208.

Illustrative Processes for Processing Data

Figure 3:
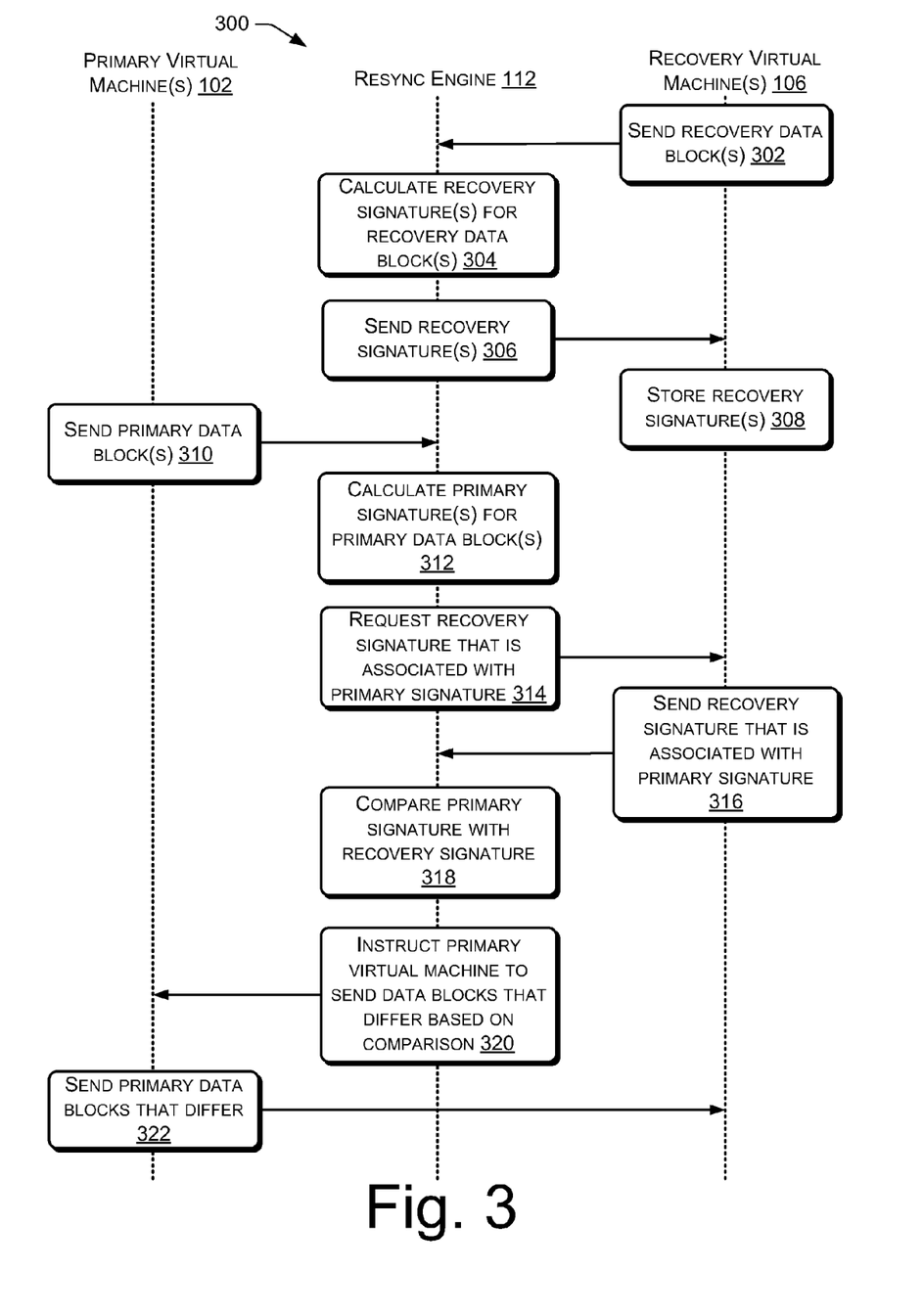
FIG. 3 illustrates an example process to synchronize data between a primary virtual machine and a recovery virtual machine.

FIG. 3 is a an example process 300 to resynchronize data between the primary VM 102 and the recovery VM 106 of FIG. 1. At block 302 of the process 300, the recovery virtual machine 106 sends one or more recovery data blocks to the resync engine 112. The data reader module 136 may receive the one or more recovery data blocks. In response to receiving the one or more recovery data blocks, at block 304 the resync engine 112 calculates a recovery signature for each recovery data block received. Next, at block 306, the resync engine 112 sends the recovery signature to the recovery VM 106, which then stores the recovery signature at block 308. In one embodiment, blocks 302 through 308 may take place independent of whether or not the resync engine 112 interacts with (e.g., communicates with) the primary VM 102.

In the example process 300, the primary VM 102 sends one or more primary data blocks to the resync engine 112 at block 310. The data reader module 136 may receive the one or more primary data blocks. At block 312, the resync engine 112 calculates a primary signature for each primary data block received. Then, at block 314, the resync engine 112 requests the recovery signature that is associated with the primary signature from the recovery VM 106. For example, the recovery signature may be associated with the primary signature based on a portion of the recovery signature including data similar to the primary signature. The recovery VM 106 sends the recovery signature associated with the primary signature at block 316.

The example process 300 continues by comparing, via the resync engine 112, the primary signature with the recovery signature at block 318. Next, at block 320, the resync engine 112 instructs the primary VM 102 which data blocks differ based on the comparison in the block 318. In response to receiving the notification, the primary VM 102 sends the one or more primary data blocks that differ from the one or more recovery data blocks to the recovery VM 106 at block 322. In some implementations, the one or more recovery data blocks that are compared with the one or more primary data blocks, and are determined to not match the one or more primary data blocks, are replaced with the one or more primary data blocks sent from primary VM 102.

Figure 4:
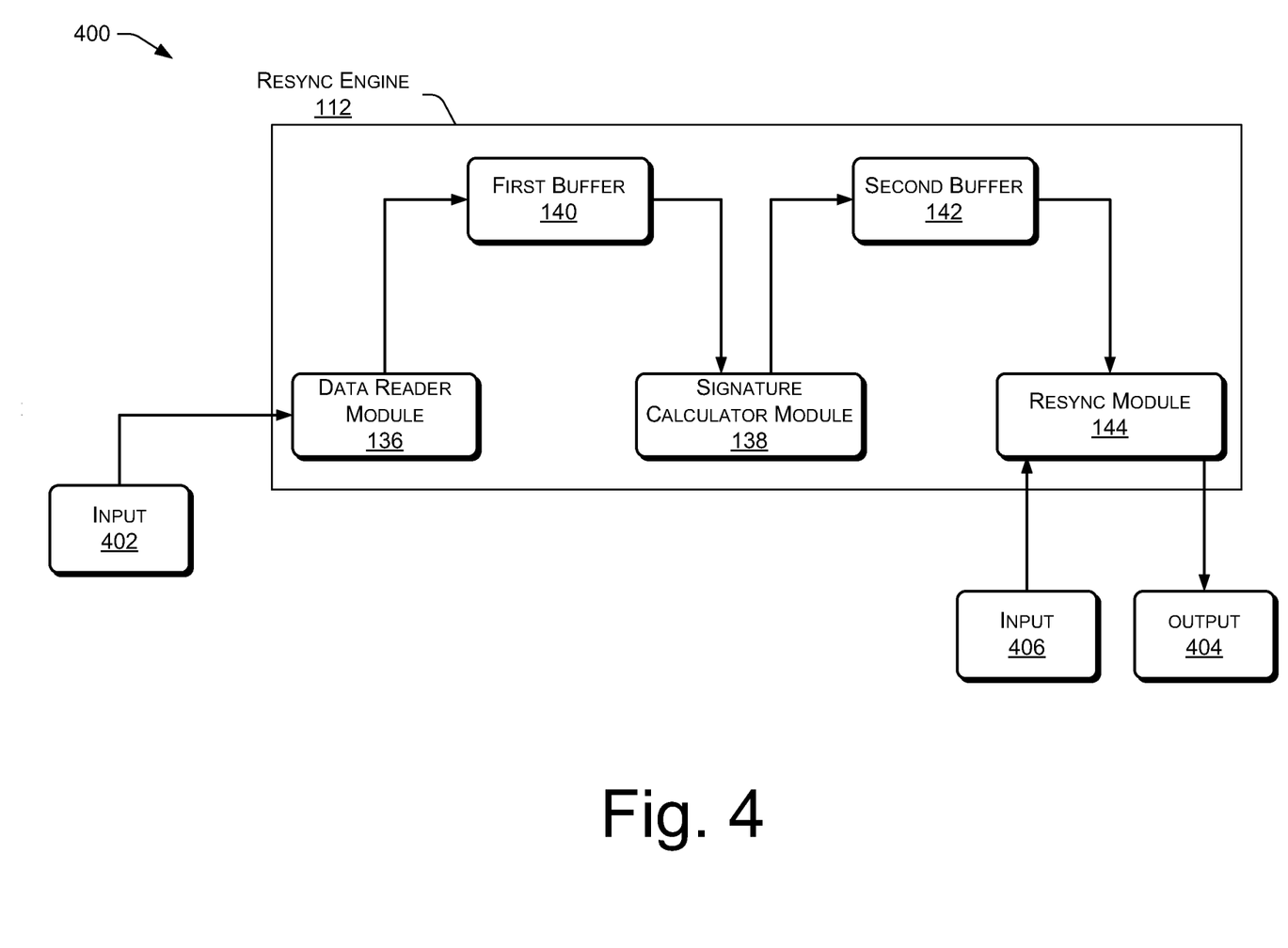
FIG. 4 illustrates an example process performed at the resync engine of FIG. 1.

FIG. 4 illustrates an example process 400 performed at the resync engine 112 of FIG. 1. As illustrated in FIG. 4, input 402 is received by the data reader module 136. In one implementation, the input 402 may comprise a primary data block from the primary VHD 204. In another implementation, the input 402 may comprise a recovery data block from the recovery VHD 210. As described above, the received data blocks are sent from the data reader module 136 to the first buffer 138, and then to the signature calculator module 138.

In the event that the input 402 comprises a primary data block, the signature calculator module 140 calculates a primary data signature. If the input 402 comprises a recovery data block, the signature calculator module 140 calculates a recovery data signature. The second buffer 142 receives the calculated signatures from the signature calculator module 140 and stores the signatures until the calculated signatures are loaded, one at a time, into the resync module 144.

In one example, when the resync module 144 receives the recovery signature data from the second buffer 142, the resync module 144 forwards the recovery data signature to the recovery VM 106. In this example, output 404 may include the recovery data signature. Here, the recovery data signature may be sent to the recovery VM 106 via the network 110. Alternatively, in the event that the resync module 144 receives the primary data signature from the second buffer 142, the output 404 may be a request sent to the recovery VM 106 for the recovery data signature. In response to the request, input 406 may comprise the recovery data signature received from the recovery VM 106.

In one embodiment, after receiving the primary data signature from the second buffer 142 and the recovery data signature as the input 406, the resync module 144 may compare the data signatures, in which case the output 404 may comprise a notification to the primary VM 102. For example, the notification to the primary VM 102 may indicate which data block differs between the primary VM 102 and the recovery VM 106. Here, the notification may further include instructions to send the data block that differs to the recovery VM 106.

Further, in one embodiment, the output 404 may comprise a notification to the recovery VM 106. For example, the notification to the recovery VM 106 may indicate which data block differs between the primary VM 102 and the recovery VM 106. Here, the notification may further include instructions to send the data block that differs to the primary VM 102.

Figure 5:
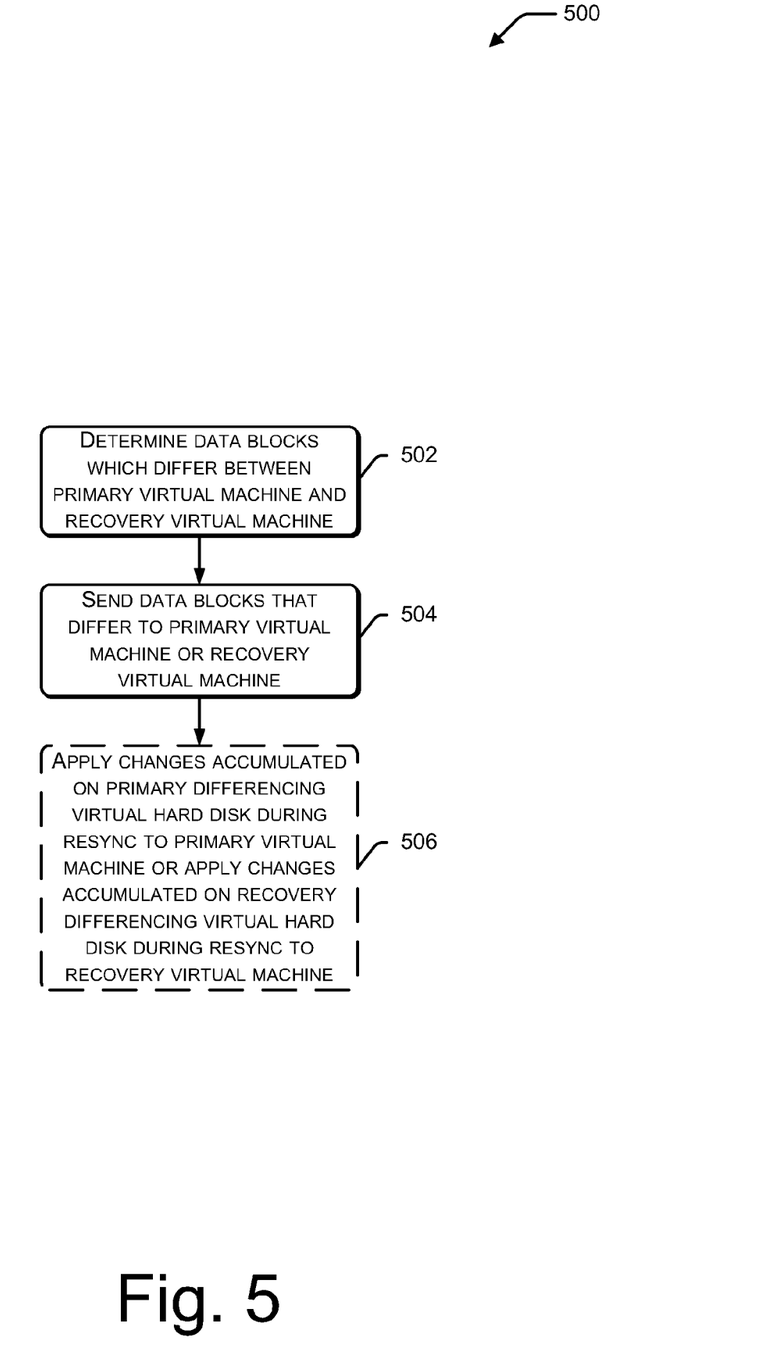
FIG. 5 is a flow diagram showing an illustrative process for providing data consistency between a primary virtual machine and a recovery virtual machine.

Illustrative Processes for Maintaining Data Consistency between Virtual Machines FIG. 5 is a flow diagram showing an illustrative process 500 for providing data consistency between the primary VM 102 and the recovery VM 106 of FIG. 1. At block 502, the process 500 determines data blocks which differ between a primary virtual machine and a recovery virtual machine. For example, the resync engine 112 may determine data blocks which differ between the primary VHD 204 and the recovery VHD 210. Here, the resync engine 112 may determine the data blocks that differ by comparing separate signature data associated with each data block stored on the primary VHD 204 and the recovery VHD 210.

At block 504, the process 500 sends the data blocks that differ to a primary virtual machine or a recovery virtual machine. In one implementation, the primary VM 102 (e.g., the primary VHD 204) may send the data blocks that differ to the recovery VM 106. For example, the resync engine 112, based on comparing the signature data, instructs the primary VHD 204 to send the blocks that differ to the recovery differencing VHD 208. In another implementation, the recovery VM 106 may send the data blocks that differ to the primary VM 102. For example, the recovery VHD 210 may send the data blocks that differ to the primary differencing VHD 202 (e.g., in response to the resync engine 112 instructing the recovery VHD 210 to do so). In one implementation, the resync engine 112 may store data in a VHD differencing bitmap indicating which sectors of the primary data block are written with new data not found in the recovery data block. Here, the resync engine 112 may read the VHD differencing bitmap to determine an offset of the primary data block that includes the new data. Additionally or alternatively, the location of the primary data block may be determined from the VHD differencing bitmap. Once the location of the primary data block is determined, the contents of the primary data block may be sent to the recovery VM 106.

At block 506, the process 500 applies changes accumulated on a primary differencing VHD during resync to a primary virtual machine, or the process 500 applies changes accumulated on a recovery differencing VHD during resync to a recovery virtual machine. In one implementation, the primary difference VHD 202 applies changes accumulated during a resync process to the primary VHD 204. For instance, production workload changes accumulated in the primary differencing VHD 202 are applied to the primary VHD 204 after the primary VHD 204 completes a transfer of one or more data blocks to the recovery VM 106. In another implementation, the recovery differencing VHD 208 applies changes accumulated during a resync process (e.g., transferring of data blocks to the primary VM 102) to the recovery VHD 210. As illustrated in FIG. 5, the dashed line indicates that the operation 506 may be performed by the primary VM 102 and/or the recovery VM 106.

Figure 6:
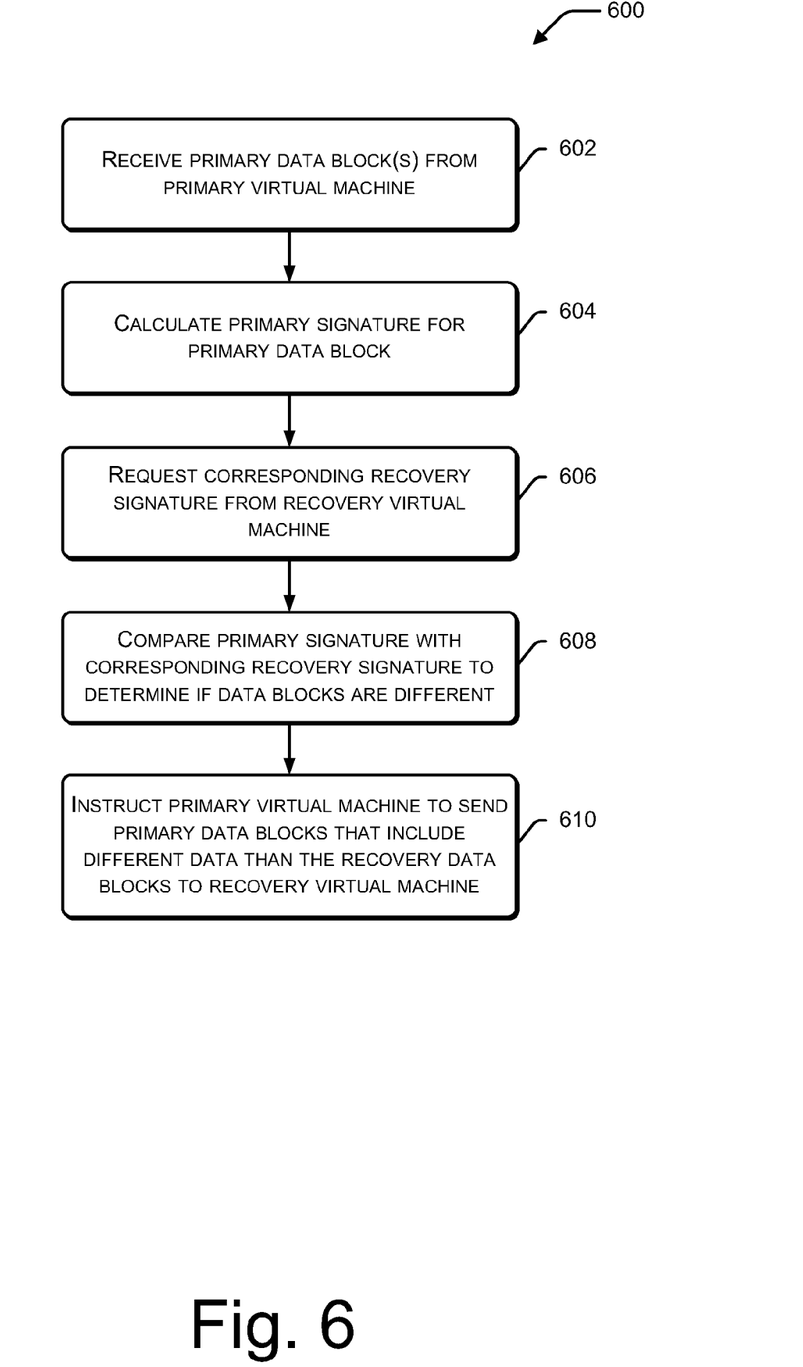
FIG. 6 is a flow diagram showing an illustrative process for processing a data block including calculating a data signature for the data block, receiving a corresponding data signature, and comparing the data signature and the corresponding data signature.

FIG. 6 is a flow diagram showing an illustrative process 600 for processing a data block including calculating a data signature for the data block, receiving a corresponding data signature, and comparing the data signature and the corresponding data signature. At block 602, the process 600 receives one or more primary data blocks from a primary virtual machine. For example, the data reader module 136 of the resync engine 112 receives the one or more primary data blocks from the primary VHD 204 on the primary VM 102. Alternatively, or additionally, the resync engine 112 may receive a stream of data from the primary VM 102. In response to receiving the one or more primary data blocks, the resync engine 112 may send each primary data block to a first buffer. For example, each primary data block may be sent from the data reader module 136 to the first buffer 138.

At block 604, the process 600 calculates a primary signature for the primary data block. For instance, each primary data block may be loaded, one at a time, from the first buffer 138 to the signature calculator module 140. In some implementations, the signature calculator module 140 calculates a hash value for each primary data block. A hash function may be used to map the hash value to the contents of each primary data block thereby allowing the hash value to represent the contents of the primary data block. In this way, hash values of a primary data block and a recovery data block may be compared rather than comparing full contents of each primary and recovery data block.

In some implementations, the signature calculator module 140 calculates hash values for one or more portions of the primary data block and/or corresponding recovery data block. For example, hash values may be calculated for every 100 KB of a 2 MB data block. In some implementations, the hash values comprise a cyclic redundancy check (CRC) value. Additionally or alternatively, the hash function may comprise a CRC-64 value.

The illustrative process 600 may include sending the calculated primary signature to a second buffer. For instance, the signature calculator module 140 may send the primary signature to the second buffer 142.

At block 606, a request for a corresponding recovery signature is sent to a recovery virtual machine. For instance, the resync module 144, in response to receiving the primary signature from the second buffer 142, requests the corresponding recovery signature from the recovery VHD 210 on the recovery VM 106.

At block 608, the process compares the primary signature with the corresponding recovery signature to determine if the data blocks associated with each signature include different data. This may be accomplished by, for example, the resync module 144.

At block 610, the process 600 instructs the primary virtual machine to send a primary data block that includes different data than a recovery data block to the recovery virtual machine. For example, the resync module 144 instructs the primary VHD 204 on the primary VM 102 to send the primary data block that includes different data than the recovery data block to the recovery differencing VHD 208 on the recovery VM 106. Upon receiving the primary data block that includes different data than the recovery data block at the recovery differencing VHD 208, the primary data block may be applied (e.g., stored) to the recovery VHD 210 which reestablishes data consistency between the primary VM 102 and the recovery VM 106.

The data consistency techniques discussed herein are generally discussed in terms of data consistency between a primary virtual machine and a recovery virtual machine. However, the data consistency techniques may be applied to two or more virtual machines located at a single site.

Illustrative Processes for Initializing Replication in a Virtual Machine

Figure 7:
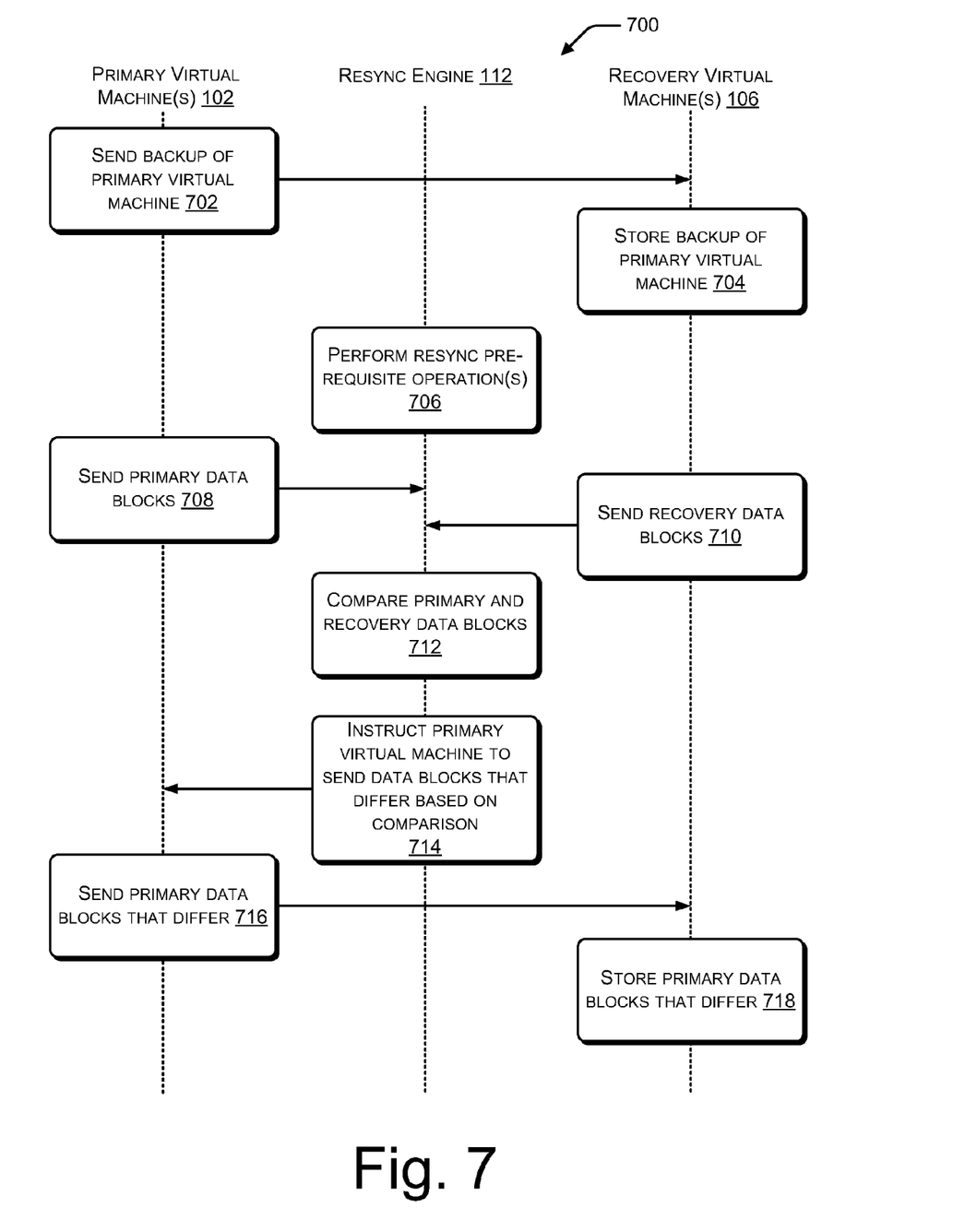
FIG. 7 illustrates an example process to initialize replication of a recovery virtual machine.

FIG. 7 is a flow diagram showing an illustrative process 700 for initializing replication of the recovery VM 106 of FIG. 1. At block 702, the process 700 sends a backup of the primary VM 102 to the recovery VM 106. The backup may comprise, for example, a copy of data (e.g., data blocks) stored on the primary VHD 204 up to a time T (e.g., a particular point in time when the backup is sent). The backup may be sent over the network 110. In some instances, the backup may be stored in a memory device and physically sent to the recovery VM 106.

At block 704, the backup of the primary VM 102 is stored on the recovery VM 106. For example, the data included in the backup is stored on the recovery VHD 210 associated with the recovery VM 106.

At block 706, the resync engine 112 performs prerequisite operation(s) to enable the recovery VM 106 to be initialized for replication with the primary 102. For example, the prerequisite operation(s) may include powering down the recovery VM 106 and/or creating the recovery VHD 210. The prerequisite operation(s) may also include the resync engine 112 verifying (e.g., checking) that the recovery VM 106 was powered down and/or verifying that the recovery VHD 210 was created. The resync engine 112 may also verify that the recovery VHD 210 and primary VHD 204 share the same geometry (e.g., the primary VHD 204 was not expanded or compacted after the backup of the primary VM 102 is sent to the recovery VM 106).

At block 708, the primary VM 102 sends primary data blocks to the resync engine 112. The primary data blocks include data stored on the primary VM 102 up to a time T+1 (e.g., a particular point in time after the backup is sent). For example, the primary VM 102 sends the primary data blocks that have been changed since the backup was sent to the recovery VM 106. Subsequently, the resync engine 112 requests recovery data blocks from the recovery VM 106. At block 710, the recovery VM 106 sends the requested data blocks to the resync engine 112. The resync engine 112 compares the primary and the recovery data blocks at block 712. For example, the resync engine 112 calculates and compares data signatures associated with the primary data blocks and the recovery data blocks as described above.

At block 714, if, for example, the comparison indicates that data blocks differ between the primary VM 102 and the recovery VM 106, then the resync engine 112 instructs the primary VM 102 to send the primary data blocks that differ from the recovery data blocks to the recovery VM 106. Next, at block 716, the primary VM 102 sends the primary data blocks that differ from the recovery data blocks to the recovery VM 106. Alternatively, if the comparison indicates that there are no data blocks that differ between the primary VM 102 and the recovery VM 106, then the resync engine 112 does not instruct the primary VM 102 to send any primary data blocks to the recovery VM 106. Here, data already stored on the recovery VM 106 (e.g., the data included in the backup stored on the recovery VHD 210) is not required to be sent from the primary VM 102 in order to initialize the recovery VM 106. In this manner, the recovery VM 106 may be initialized in less time and with less impact to a network due, in part, to fewer transfers of primary data blocks and/or less data being transferred.

At block 718, the recovery VM 106 stores the primary data blocks that differ and are sent from the primary VM 102. Here, the recovery VM 106 includes the same data (e.g., in the recovery VHD 210) as the primary VHD 204 at time T+1. From this point, data consistency may be maintained between the primary VM 102 and the recovery VM 106 by identifying delta changes (e.g., changes to a production workload) as in the example processes described in FIG. 3 and FIG. 4. In addition, the log 206 may be applied (e.g., stored) to the recovery VM 106 after the resync process completes (e.g., the resync engine 112 is no longer processing data from the primary VM 102 and the recovery VM 106, or instructing either the primary VM 102 and/or the recovery VM 106) in order to send any changes to the production workload 212 captured by the log 206 during the resync process.

Illustrative Processes for Synchronizing a Primary Virtual Machine

Figure 8:
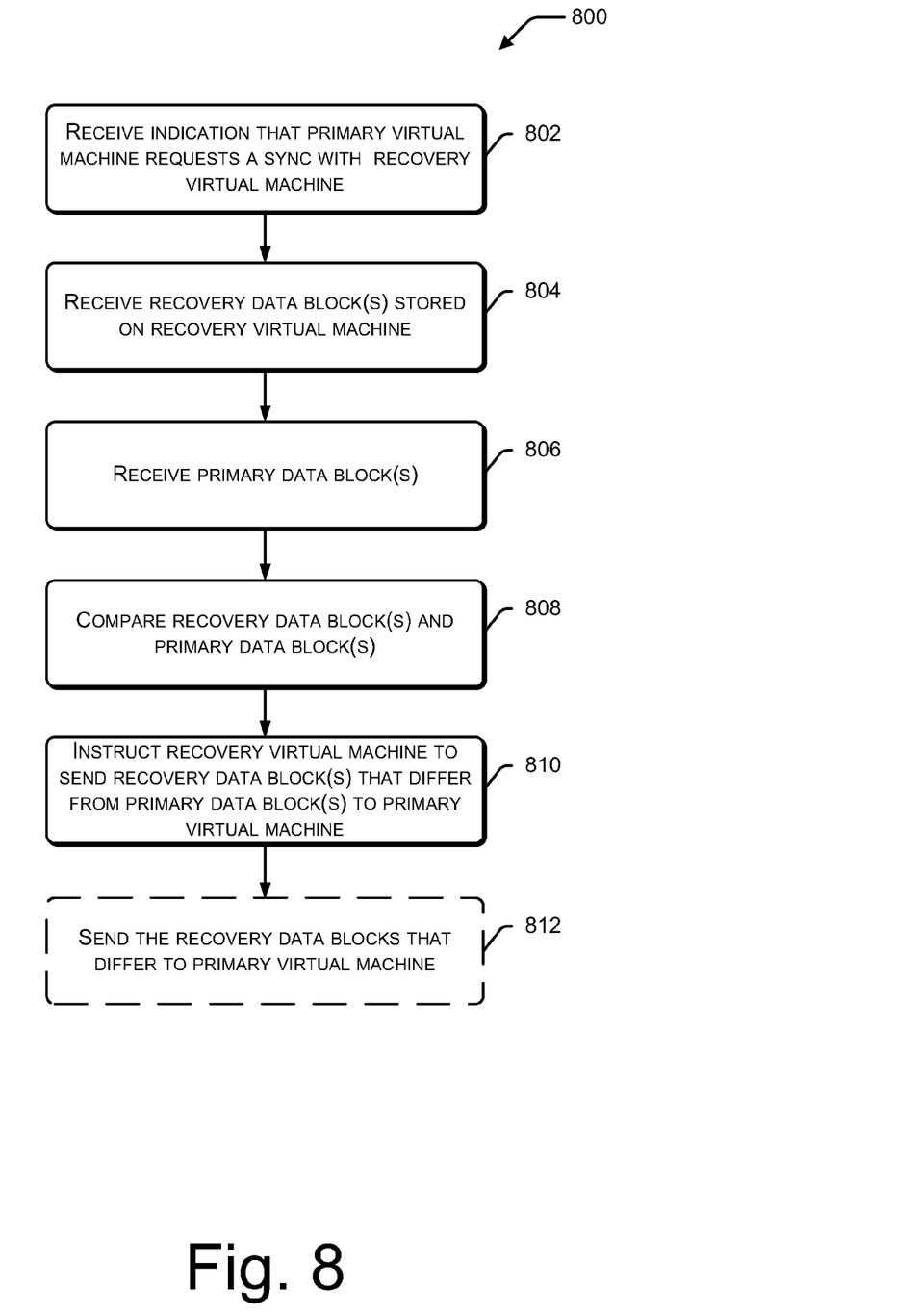
FIG. 8 is a flow diagram showing an illustrative process for synchronizing a primary virtual machine with data from a recovery virtual machine.

FIG. 8 is a flow diagram showing an illustrative process 800 for synchronizing a primary virtual machine with data from a recovery virtual machine. For example, the primary VM 102 may be synchronized with data from the recovery VM 106. In some instances, the illustrative process 800 may be performed following a failure at the primary host 104 resulting in failover of production workloads to the recovery VM 106. In such instances, at some point the production workloads may failover back to the primary host 104. Here, when the primary VM 102 is ready to take over the production workloads from the recovery VM 106, the resync engine 112 may synchronize the primary VM 102 by comparing data blocks at both the primary VM 102 and the recovery VM 106, and sending to the primary VM 102 the data blocks that have been updated on the recovery VM 106 while the primary VM 102 has been offline. In some instances, the illustrated process 800 may be performed without interrupting, or requiring coordination with an existing backup workflow (e.g., change tracking mechanisms that enable applications to query for changes to data in a database and access information that is related to these changes).

At block 802, the resync engine 112 receives an indication that a primary virtual machine requests syncing with a recovery virtual machine. For example, the primary VM 102 may send an indication to the resync engine 112 to sync (e.g., reestablish a replication relationship) with the recovery VM 106. The primary VM 102 may have been offline, due possibly to a shut-down of the primary VM 102 and subsequent failover to the recovery VM 106. Here, the primary VM 102 may require production workload changes stored on the recovery VM 106. The production workload changes may be stored as data blocks stored on the recovery virtual machine while the primary virtual machine is offline.

At block 804, the resync engine 112 receives one or more recovery data blocks stored on a recovery virtual machine. For instance, the one or more recovery data blocks are sent from the recovery VM 106 (e.g., stored on the recovery VHD 210) to the resync engine 112. Next, at block 806, the resync engine 112 receives one or more primary data blocks from a primary virtual machine. For example, the one or more primary data blocks stored on the primary VM 102 (e.g., stored on the primary VHD 204) are received by the resync engine 112.

At block 808, the resync engine 112 compares the recovery data blocks and the primary data blocks. For example, the resync module 144 in the resync engine 112 compares the one or more primary data blocks with the one or more recovery data blocks to determine which data blocks differ. If, for example, the comparison indicates that data blocks differ, at block 810, the recovery virtual machine is instructed to send the one or more recovery data blocks that differ from the one or more primary data blocks to the primary virtual machine. For example, the resync engine 112 instructs the recovery VM 106 to send, to the primary VM 102, the recovery data blocks that differ from the primary data blocks.

At block 812, the recovery VM 106 sends the one or more recovery data blocks that differ from the one or more primary data blocks to the primary virtual machine. For example, the recovery VM 106 sends the one or more recovery data blocks that differ from the one or more primary data blocks to the primary virtual hard disk 204 on the primary VM 102. In some implementations, the one or more recovery data blocks may be sent from the recovery virtual hard disk 210 to the primary differencing virtual hard disk 202. In this implementation, the primary differencing virtual hard disk 202 may apply the one or more recovery data blocks to the primary virtual hard disk 204. As illustrated in FIG. 8, the dashed line indicates that the block 812 may be performed by the primary VM 102 and/or the recovery VM 106.

Processes 300, 400, 500, 600, 700, and 800 are illustrated as a collection of blocks in a logical flow graph representing a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the processes are described is not intended to be construed as a limitation, and any number of the described process blocks can be combined in any order and/or in parallel to implement the process. Moreover, in some embodiments, one or more blocks of the process may be omitted from the processes without departing from the spirit and scope of the subject matter described herein.

Although the processes 300, 400, 500, 600, 700, and 800 are illustrated as being implemented in the architecture 100 of FIG. 1, these processes may be performed in other architectures. Moreover, the architecture 100 of FIG. 1 may be used to perform other operations.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system, comprising:
one or more processors; and
memory, communicatively coupled to the one or more processors, storing one or more modules that are executable by the one or more processors to perform acts comprising:
receiving one or more first data blocks from a primary virtual hard disk;
sending the one or more first data blocks to a first buffer;
receiving, after a time period has expired since the one or more first data blocks were sent to the first buffer, the one or more first data blocks from the first buffer;
calculating a first data signature for at least a portion of a data block of the one or more first data blocks;

sending the first data signature to a second buffer;
receiving the first data signature from the second buffer after a time period has expired since the first data signature was sent to the second buffer;
in response to receiving the first data signature from the second buffer, requesting a second data signature from a recovery virtual machine, the second data signature representing one or more second data blocks corresponding to the one or more first data blocks;
receiving the second data signature from the recovery virtual machine;
comparing the first data signature with the second data signature;
determining that the one or more first data blocks and the one or more second data blocks are different based, at least in part, on the comparison; and causing, at least partly in response to the determining that the one or more first data blocks and the one or more second data blocks are different, the one or more first data blocks to be sent from the primary virtual hard disk to the recovery virtual machine.

2. The system of claim 1, wherein the first data signature and/or the second data signature each comprises a cyclic redundancy check (CRC) signature.

3. The system of claim 2, wherein the CRC signature is a CRC-64signature.

4. The system of claim 1, wherein the first buffer and/or the second buffer each comprises a circular buffer.

5. The system of claim 1, wherein calculating the first data signature comprises:
  calculating a data signature for a portion of a data block of the one or more first data blocks, and
  calculating an additional data signature for an additional portion of the data block of the one or more first data blocks.

6. The system of claim 1, wherein the acts further comprise:
  receiving the one or more second data blocks from a recovery virtual hard disk of the recovery virtual machine;
  sending the one or more second data blocks to the first buffer;
  receiving the one or more second data blocks from the first buffer;
    calculating, at least partly in response to receiving the one or more second data blocks from the first buffer, the second data signature for at least a portion of a data block of the one or more second data blocks; and
    sending the calculated second data signature to the recovery virtual machine, the calculated second data signature being stored at the recovery virtual machine, and wherein:
    the requesting the second data signature includes requesting the calculated second data signature stored at the recovery virtual machine.

7. The system of claim 1, wherein the one or more first data blocks sent to the recovery virtual machine are received by a recovery differencing virtual hard disk.

8. A method for synchronizing data between a first virtual machine and a second virtual machine comprising:
  under control of one or more processors:
    calculating a first data signature for a first data block associated with the first virtual machine, wherein the calculating the first data signature comprises calculating a signature for a first portion of the first data block and calculating a signature for a second portion of the first data block;
    calculating a second data signature for a second data block associated with the second virtual machine, wherein the calculating the second data signature comprises calculating a signature for a first portion of the second data block and calculating a signature for a second portion of the second data block;
    determining that the first data signature and the second data signature are different; and
    causing, at least partly in response to the determining that the first data signature and the second data signature are different, the first data block to be sent to the second virtual machine.

9. The method of claim 8, wherein:
  the second data block is stored in the second virtual machine; and
  the second data block is replaced with the first data block sent to the second virtual machine.

10. The method of claim 8, wherein
  the determining includes determining that the signature for the first portion of the first data block is different than the signature for the first portion of the second data block and/or determining that the signature for the second portion of the first data block is different than the signature for the second portion of the second data block.

11. The method of claim 8, wherein the first data signature and/or the second data signature each comprises a cyclic redundancy check (CRC) signature.

12. The method of claim 11, wherein the first data signature and/or the second data signature each comprises a cyclic redundancy check 64 (CRC-64) signature.

13. The method of claim 8, wherein the first data block and the second data block are stored in a first memory and a second memory, respectively.

14. The method of claim 8, wherein the first virtual machine is located at a primary host and the second virtual machine is located at a recovery host geographically separate from the primary host.

15. The method of claim 8, wherein the first virtual machine and the second virtual machine are implemented on one or more first servers and one or more second servers, respectively.

16. One or more computer readable media encoded with instructions that, when executed, direct a computing device to perform operations comprising:
  receiving a first data block from a primary virtual machine;
  calculating a first signature data for the first data block, the first signature data being a representation of content included in the first data block;
  requesting, from a recovery virtual machine, a second signature data representative of content included in a second data block, the second data block corresponding to the first data block;
  determining that the content included in the first data block is different than the content included in the second data block by comparing the first signature data of the first data block with the second signature data of the second data block;
  at least partly in response to the determining, storing information in a virtual hard disk differencing bitmap;
  determining an offset of the first data block based at least in part on the information stored in the virtual hard disk differencing bitmap;
  locating the first data block in a virtual hard disk of the primary virtual machine based at least in part on the offset of the first data block; and
  causing the first data block to be sent from the primary virtual machine to the recovery virtual machine.

17. The one or more computer readable media of claim 16, wherein the information indicates that the content of the first data block is different than the content of the second data block, and wherein the operations further comprise causing a copy of the content of the first data block to be sent to the recovery virtual machine.

18. The one or more computer readable media of claim 17, wherein the copy of the content of the first data block is sent to a differencing virtual hard disk associated with the recovery virtual machine.

19. The one or more computer readable media of claim 18, wherein the operations further comprise:

causing the first data block to be sent to the differencing virtual hard disk to be stored in a virtual hard disk on the recovery virtual machine.

20. The one or more computer readable media of claim 16, wherein the first signature data of the first data block and/or the second signature data of the second data block each comprises a cyclic redundancy check signature.

* * * * *